No. 792,276. Patented June 13, 1905.

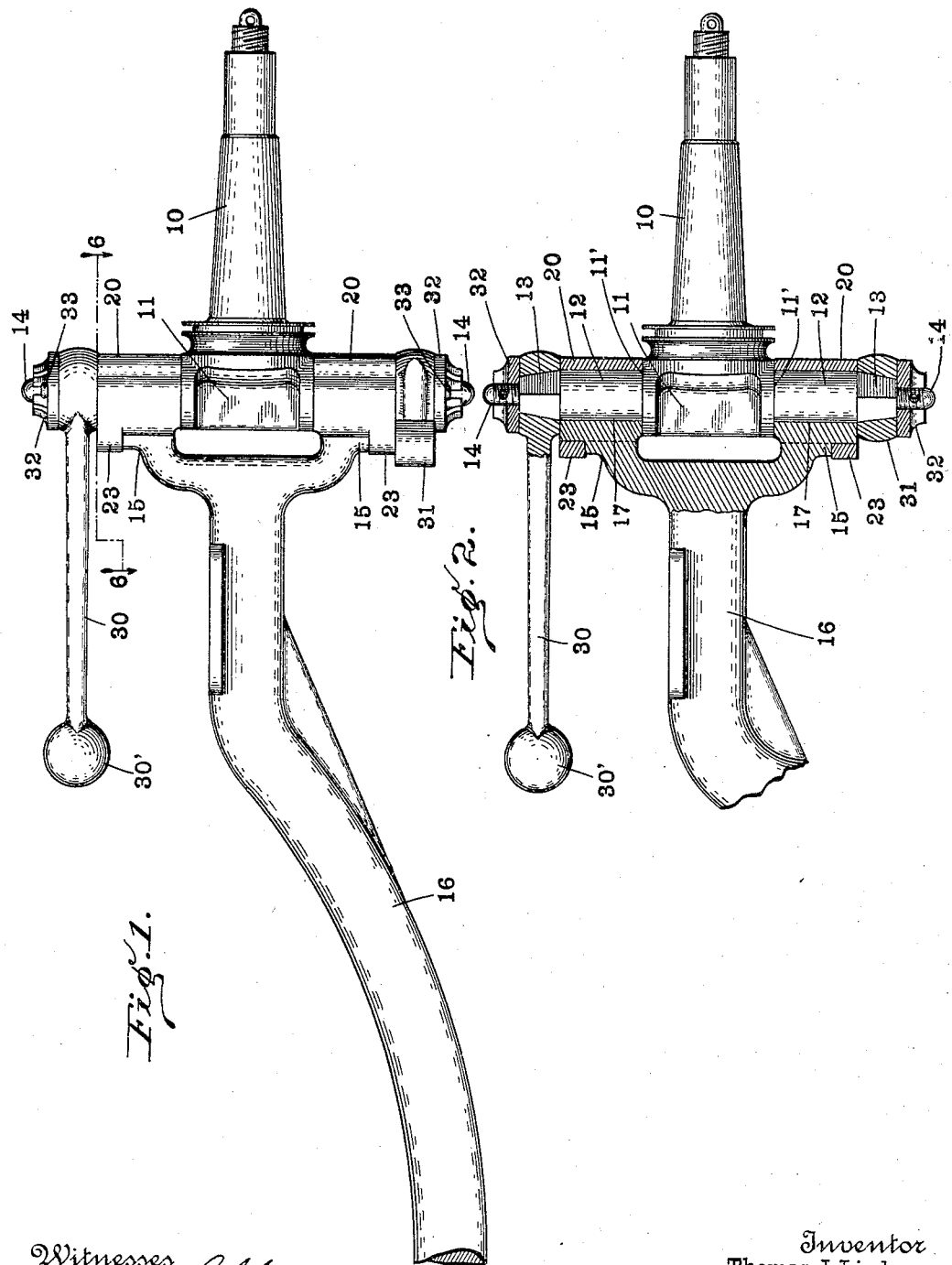

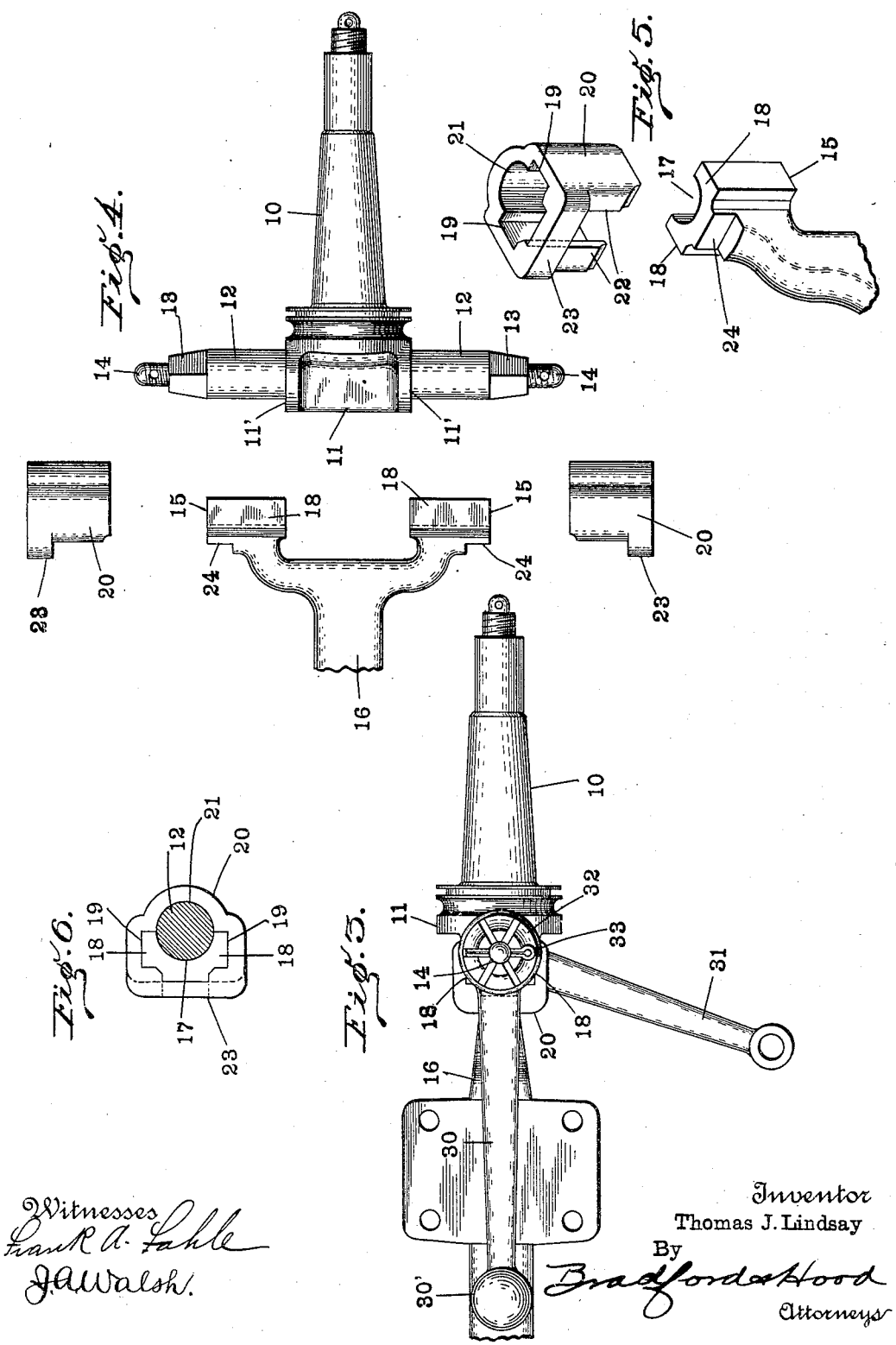

UNITED STATES PATENT OFFICE.

THOMAS J. LINDSAY, OF INDIANAPOLIS, INDIANA.

STEERING-WHEEL SPINDLE.

SPECIFICATION forming part of Letters Patent No. 792,276, dated June 13, 1905.

Application filed January 9, 1905. Serial No. 240,232.

*To all whom it may concern:*

Be it known that I, THOMAS J. LINDSAY, a citizen of the United States, residing at Indianapolis, in the county of Marion and State of Indiana, have invented certain new and useful Improvements in Steering-Wheel Spindles, of which the following is a specification.

In the manufacture of automobiles and other similar vehicles each steering-wheel is carried upon a short horizontal stud or spindle supported at its inner end on a vertical axis. Heretofore it has been common to make such a structure with an integral arm by means of which it may be swung and to pivot it upon an independent vertical pin, the structure being supported between the upper and lower members of a vertical yoke secured to or formed integral with the connecting stationary axle. A structure of this kind is difficult to manufacture, and it has been heretofore impractical to make the vertical pin integral with the spindle.

The object of my present invention is to produce a construction in which the vertical pin may be made integral with the wheel-spindle, thus increasing the effective bearing length of the vertical pivot, and to so construct the parts that they may be easily made and readily assembled, the vertical bearing extending to the extreme ends of the yoke instead of being merely the length of the vertical width of the spindle structure.

A further object of my invention is to so arrange the parts that the operating-arm and the arm to which the connecting cross-rod is attached may be placed in different vertical planes, thus providing a new structure which is advantageous in a drop-axle structure.

A further object of my invention is to provide a construction in which the parts may be identical for the two sides of the vehicle, thus making it possible to use the same parts for either left-hand or right-hand steering arrangement.

The accompanying drawings illustrate my invention.

Figure 1 is a side elevation of an embodiment thereof; Fig. 2, a vertical section; Fig. 3, a plan; Fig. 4, a side elevation of a disassemblement of the yoke, the spindle structure, and the two attaching-sleeves; Fig. 5, a disassembled perspective of one of the attaching-sleeves and the coöperating yoke portion, and Fig. 6 a plan with the operating-lever removed.

In the drawings, 10 indicates the wheel-spindle, from the main body 11 of which extend in opposite directions the pins 12 12. The main body 11 is provided top and bottom with parallel shoulders. At each outer end each pin is provided with a squared portion 13, and beyond this is a threaded pin 14, the parts 12, 13, and 14 being preferably integral with the parts 10 and 11. The main body 11 is provided with a pair of parallel shoulders 11', (immediately at the base of the pins 12,) which fit closely between the adjacent ends of the yoke members 15 15, which are attached to or formed integral with the fixed axle 16. Each yoke member 15 is provided with a semicylindrical vertical socket 17, adapted to receive one of the pins 12, and it also has a pair of lateral projections 18 18, which are adapted to be embraced within lateral slots 19 19, formed in a sleeve 20, which is also provided adjacent the slots 19 with a vertical semicylindrical socket 21, which mates with and complements the socket 17. The sleeve 20 is provided with a pair of lips 22, which are adapted to embrace the lateral projections 18, and at the outer end of the sleeve these lips are connected by a cross-bar 23, which is adapted to fit down behind a shoulder 24, formed at the outer end of the rear side of the yoke member 15. Either of the squared portions 13 is adapted to receive an operating-lever 30 or a cross-bar arm 31, the operating-lever 30 being preferably provided with a ball end 30', by means of which it may be connected to any suitable or desirable form of steering-gear. The levers 30 and 31 are held in position by means of threaded nuts 32, which fit the threaded pins 14 and are held in position by any suitable checking means—such, for instance, as a cotter-pin 33.

In order to assemble the parts, the main body 11 of the spindle structure is placed between the adjacent ends of the yoke members 15 15, and the pins 12 pass into the sockets 17. Thereupon the sleeves 20 are slipped endwise over the yoke members 15 and the pins 12, thus completing the bearing for said pins and securely holding the parts in position without other fastening means. The arms 30 and 31 are then slipped over the squared ends 13 and held in position by means of the nuts 32. The same spindle structure and other parts are used for both sides of the machine and are absolutely interchangeable, the pins 12 being integral with the main body of the spindle, because the spindle and vertical pivot equal in length the entire length of the yoke, whereas heretofore the vertical bearing has only been of a length equal to the distance between the adjacent ends of the yoke. It is also possible, by reason of the pins 12 moving with the spindle, to place the operating-arm 30 and the cross-rod frame 31 in different vertical planes.

I claim as my invention—

1. In a structure of the class described, the combination, of a yoke provided with a pair of vertically-separated members each having in its outer face a vertical semicylindrical socket, a spindle structure having a horizontal wheel-spindle and vertical pivot-pins adapted to enter the semicylindrical socket of the yoke members, and detachable retaining-caps each provided with a complemental pin-receiving socket, and means for attaching said caps to the yoke members.

2. The combination with a yoke having a pair of vertically-separate members each having on its outer face a semicylindrical vertical socket, a spindle member consisting of a horizontal wheel-spindle and a pair of oppositely-extending vertical pins adapted to fit the sockets of the yoke members with the main body of the spindle fitted between the adjacent ends of the yoke members, a pair of sleeved members each provided with a semi-cylindrical socket adapted to fit the pin, a longitudinal separable transversely-inseparable connecting engagement between each sleeve and its yoke member, and means for holding said sleeves in position.

3. The combination with a yoke having a pair of vertically-separate members each having on its outer face a semicylindrical vertical socket, a spindle member consisting of a horizontal wheel-spindle and a pair of oppositely-extending vertical pins adapted to fit the sockets of the yoke members with the main body of the spindle fitted between the adjacent ends of the yoke members, a pair of sleeve members each provided with a semi-cylindrical socket adapted to fit the pin, a longitudinal separable transversely-inseparable connecting engagement between each sleeve and its yoke member, levers fitted on the polygonal ends of the pins and serving to hold the sleeve members in position, and means for holding said levers on the pins.

In witness whereof I have hereunto set my hand and seal, at Canton, Ohio, this 4th day of January, A. D. 1905.

THOMAS J. LINDSAY. [L. S.]

Witnesses:
CHAS. C. WATTENBAUGH,
J. L. FLOYD.